Mar. 6, 1923.

M. L. IOCHUM

ATMOSPHERIC TURBINE

Filed Apr. 12, 1921

Inventor
Marie L. Iochum
By
James L. Norris
Attorney

Mar. 6, 1923.

M. L. IOCHUM 1,447,853

ATMOSPHERIC TURBINE

Filed Apr. 12, 1921

Inventor
Marie L. Iochum
By James L. Norris
Attorney

Mar. 6, 1923.

M. L. IOCHUM 1,447,853

ATMOSPHERIC TURBINE

Filed Apr. 12, 1921

Patented Mar. 6, 1923.

1,447,853

UNITED STATES PATENT OFFICE.

MARIE-LOUISE IOCHUM, OF PARIS, FRANCE.

ATMOSPHERIC TURBINE.

Application filed April 12, 1921. Serial No. 460,627.

*To all whom it may concern:*

Be it known that I, MARIE-LOUISE IOCHUM, née ADOLPHE, a citizen of the Republic of France, residing at 34 Rue des Martyrs, Paris, Seine, France, have invented new and useful Improvements in Atmospheric Turbines, of which the following is a specification.

My invention relates to an atmospheric turbine the operation of which requires no orientation mechanism and which is constructed in such a way that its receiving, driving surfaces are constantly trimmed or oriented face to windward during their operating travel and are automatically held back from the wind during their return travel so as to avoid any braking effect.

In this way a maximum efficiency is obtained according to the formula $T = K S . V.^3$, where T is the work collected, K a constant dependent on the device, S the surface subjected to the wind and V the wind velocity, the coefficient K being greatly improved due to my invention.

According to my invention, the atmospheric turbine comprises a polygonal or cylindrical central drum carrying an upper plate and a lower plate between which, and outside, the central drum, are mounted a plurality of panels, keyed at one of their sides on vertical axes which are spaced circumferentially on circles concentric with the drum, these panels rotating round the said axles, so as to get oriented as required under the action of the wind or being connected together in groups diametral to the turbine by mechanical connections, positively ensuring their proper orientation.

An embodiment of my invention is diagrammatically represented as an example by the appended drawings wherein—

Figure 1ª is a front elevation of Figure 1 without the shutters but showing the position of the ordinary "night caps" or hoods.

Figure 2ª is a front view of position 29 and 32 of Fig. 1.

The turbine includes a cylindrical drum 1 carrying an upper plate or cover 2 and a lower plate 3, drum 1 and plates 2 and 3 are constituted by a frame made of metal, wood, reinforced concrete or any other suitable material. Drum 1 has a solid surface, that is to say a surface through which the wind cannot pass.

Figure 1:
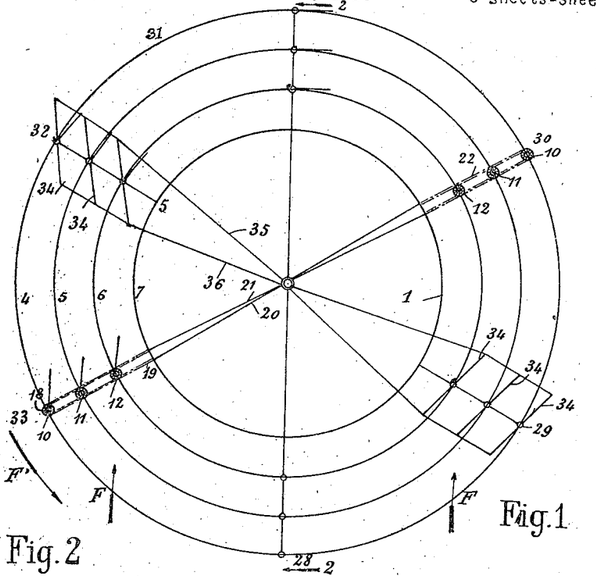
Figure 1 is a plan view of the turbine with the cover removed.
Figure 2:
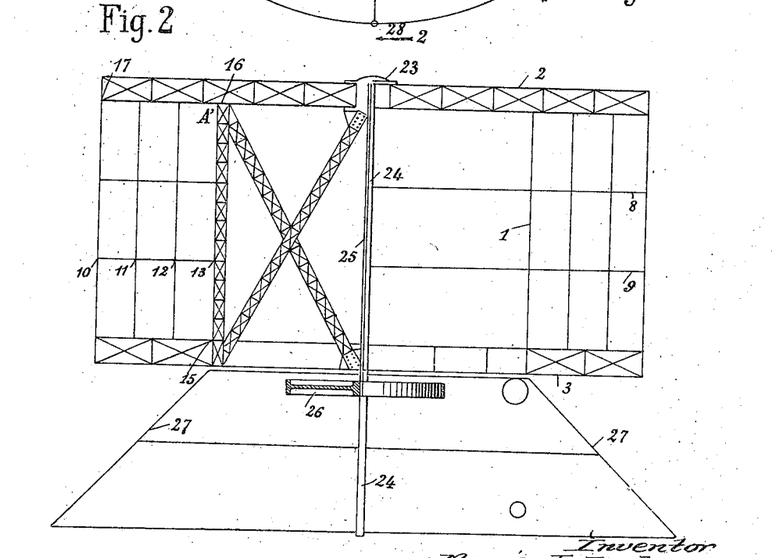
Figure 2 is a vertical section according to line 2—2 Figure 1.

Between the periphery of the drum 1 and of the plates 2 and 3 are located a series of concentric circles 4 5 8 (Fig. 1) the number of which may vary, depending on the diameter of the apparatus. Figure 2 shows four tiers of such circles including the end plates 2 and 3, the intermediate tiers being arranged between the said plates. These tiers are connected one with the other by vertical uprights 10, 11, 12, 13 (the latter being merged in the surface of the drum) which, with the cross pieces 10—11—, 11—12—, 12—13—; (positioned in the plane of tiers 8 and 9) divide into nine preferably equal rectangles, the rectangle 14, 15, 16, 17. Circles 4, 5, 6, are divided into an even number of equal portions by three diametral planes, spaced 60 degrees, which determine six surfaces such as 14, 15, 16, 17 (Figure 2). The uprights 10, 11, and 12 constitute rotary axles on which are keyed panels corresponding in number to the rectangles divisional of surface 14, 15, 16, 17. In this way the panels of each vertical series are rigid with their respective axle of rotation 10, 11 or 12. These panels seat in recesses provided along the sides of the divisional rectangles so as to ensure a tight seat for the said panels. It will be understood that the panels can thus work on one side only of the plane of each surface 14, 15, 16, 17 for instance behind the said surface as positioned in Figure 2.

At its upper part, each of the axles 10, 11 and 12 carries a toothed wheel 18, which cooperates with a cross bolt comprising a chain 19 the two ends of which are connected by crossed cables 20, 21 with a similar chain 22 which meshes with the toothed wheels of the series of axles similar to 10, 11, 12 diametrally opposite the first named wheels meshing with chain 19. The arrangement is such that when a series of panels is open the diametrically opposite series is closed.

The whole system as described constitutes the turbine proper. The upper plate carries at its center a bearing 23 resting on a vertical axle 24. A tube 25 surrounding this axle and rigid with the bearing and with the turbine is guided at its lower part, concentrically to axle 24, by a ball bearing. The said tube carries a pulley 26 serving to transmit motion in any preferred way.

The turbine and its axle are supported by a base 27 of appropriate size which may be put up either on the ground at favourable places or on the upper part of any convenient timber work, scaffolding or building.

The working is as follows:

Supposing the wind blows in the direction of the arrow F the panels of position 28 are closed under the action of the wind and those of position 31 are closed due to their connection. The panels of position 29 are also closed and submitted to the action of the wind which causes the turbine to revolve in the direction of the arrow F' while the panels of position 32, open under the action of the wind and are aided in their opening motion by the panels of position 29. The panels of position 30 are still being acted upon by the wind while those of positions 33, being open, offer no resistance to the wind to which they present only their edge. Passing from position 33 to position 28 the panels close under the action of the wind and cause the diametrically opposite panels to open, the latter being then in a zone where the wind exerts no action, since this zone is sheltered by the central drum 1. It will thus be apparent that when they are driving, the panels offer their whole surface to the action of the wind, while, when coming back to driving position in a direction inverse to the direction of the wind, they offer only their edge to the latter and so exert no braking action.

There is no need therefore to orient the apparatus since, whatever the direction of the wind, the diametrically opposite series of panels mutually control one another so that one of them takes up the whole wind power while the other one exerts no braking action. The mechanical connection hereabove described could be replaced by the the following one: Through the upper part of each of the axles 10, 11, 12 is positioned a properly oriented rod 34, that is to say oriented 45 degrees in respect to the corresponding panel and the two ends of the rods of a series of panels are connected one with the other and with the ends of the rods of the diametrically opposite series by crossed cables 35, 36 which play the same part as cables 20 and 21.

The said toothed wheels, drums or grooved pulleys 18 as found most convenient, can be mounted on either end of axles 10, 11 and 12, or on any other point of such axles.

The end panels mounted on axle 10 can protrude out of circumference 4 (Figure 2) a distance equal to, greater or smaller than the width of the said panels, so as to substantially increase the surface 14, 15, 16 and 17 outwards from the diameter of the apparatus; the outer end of such extended panels can terminate in a wingtip or winglet made of a mobile panel so as to form in the receiving portion a right angle to and with the main panel, the said right angle or square being intended to form a pocket and prevent easy passage of the wind off the panel and such small mobile panel in the contrary position, folding out of the way along the extended main panel so as to in no wise brake the apparatus. This device increases the efficiency of the apparatus.

Figure 1A:
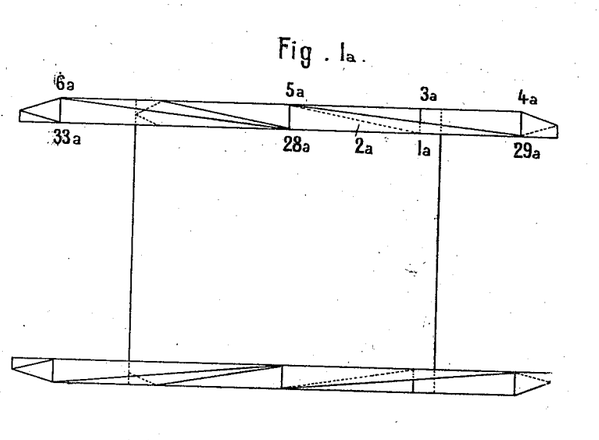

As may be seen from Fig. 1$^a$, wherein 6$^a$, 33$^a$, 5$^a$, 28$^a$ and 4$^a$ 29$^a$ show diagrammatically the section of diametrical beams of the structure which supports the plates 2 and 3 of Fig. 2, the top edge of each beam is connected to the bottom edge of the preceding one, by a sloping surface, such as 1$^a$, 5$^a$, 29$^a$ in such a manner that the wind blowing from the right in Fig. 1$^a$ is deflected by said surface which offers a minimum resistance to the wind.

Figure 2A:
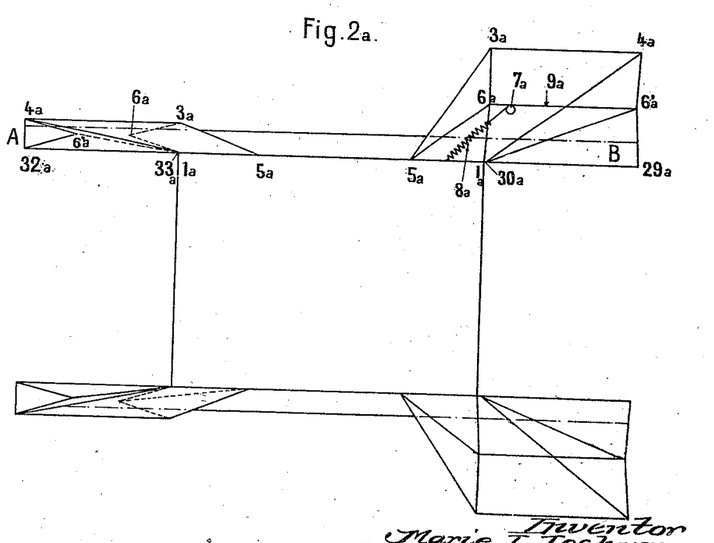

Referring now to Fig. 2$^a$, there is provided along the outer part of each diametrical beam such as 30 33, 31—28 and 32—29 of Fig. 1, that is to say along the part that extends outside of the central drum 1, a collapsible structure consisting of a quadrangular flap 3$^a$, 4$^a$, 30$^a$, 5$^a$ hinged along the line 30$^a$, 5$^a$ to the end plate of the turbine, the lines 1$^a$, 3$^a$ and 5$^a$, 3$^a$ on the one hand, and 4$^a$, 1$^a$ and 1$^a$ 29$^a$ on the other hand being connected together by triangular sides 3$^a$, 5$^a$, 1$^a$ and 4$^a$, 30$^a$, 29$^a$. Said sides are capable of being folded inwards along the lines 5$^a$, 6$^a$ and 30$^a$, 6$^a$ respectively. Their folding movement is aided by means of a cable 9$^a$ connecting the points 6$^a$, 6'$^a$ and to which is connected another cable passing over a pulley 7$^a$ and connected to one extremity of a tension spring 8$^a$ the other extremity of which is fastened to a fixed point of the turbine structure.

The operation is as follows:

When the collapsible structure becomes exposed to the action of the wind, during the rotation of the turbine, that the wind blows towards the face 1$^a$, 3$^a$, 4$^a$, 29$^a$ the collapsible structure opens, as shown to the right of Fig. 2ª and is submitted to the full force of the wind. After the collapsible structure has rotated with the turbine about one half of a revolution, the wind tends to close said collapsible structure as indicated to the left of Fig. 2ª, and the collapsing movement and folding in of the sides of the structure is aided by the action of the spring 8ª which pulls the points 6ª, 6'ª inwards.

As shown in Fig. 2ª, collapsible structures such as those just described, are arranged both on the upper and lower end plates of the turbine.

In order to obviate sudden jerks which sudden wind variation might subject the atmospheric turbine to, and in order to provide it with a fly wheel operable to store the input power, and by extending its diameter, to allow first the rotary speed of the apparatus to be regulated and second, any attempt at racing under the influence of too great a velocity of the fluid element to be braked or checked there has been added to the afore described device an expansible run or felloe which is divided into parts and which is applicable specially to this turbine and generally to all turbines the rotation axle of which is vertical.

Figure 3:
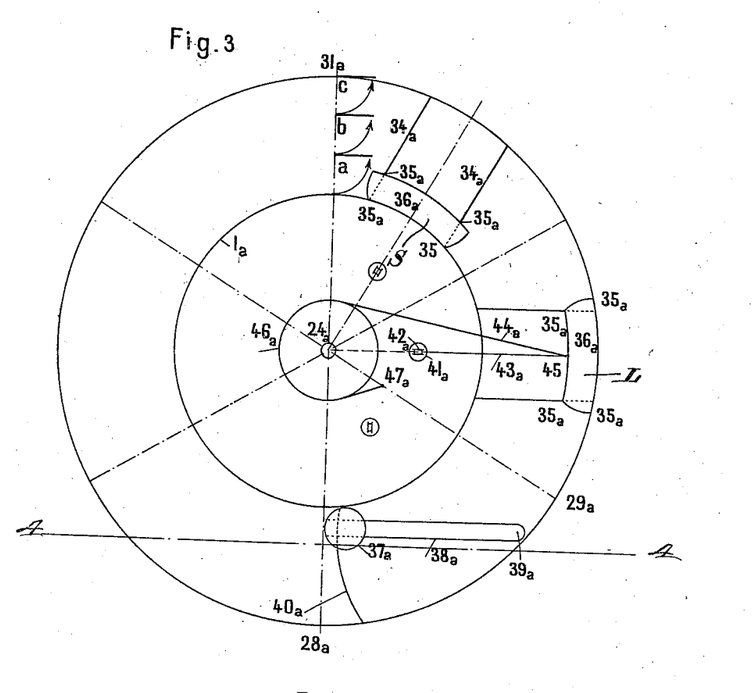
Figure 3 shows the position 30 to 31 at the moment when at 31 panels *a b c* are open describing around axles *a b c* an arc indicated by the arrow, the central drum being round.

Referring to Figure 3, in the space left free between the end of the open panels $a, b, c$, of position 31 and the surface of the panels of position 30, are located two parallel rails 34 made of two T-bars of the same size, the two T-bars being screwed flat on the lower plate 3, presenting the T-bars with their stems upward to serve as a track for grooved masses 36 and allowing the latter to move readily from a position against the drum as shown at S between position 30 to 31 to the peripheric position L it occupies between positions 29 to 30.

Whatever the shape or mode of translation between each double position of the said masses 36, which are all of the same volume and weight, their operation and utility for the apparatus are as follows:

Due to the rotation of the turbine, the masses 36 or 37 or any other as the case may be, constitute the rim or felly of a fly wheel which stores power and imparts regularity to the apparatus, when the speed of rotation increases, the said masses 36 under the effect of centrifugal force tend to get away from the center. At rest and up to a certain speed of the apparatus, they are kept against the central drum, by the action of a powerful coil spring 41 secured (Figure 4) to the upper plate 2 of the apparatus and connected by a cable 43, which extend level with the mass over pulley 42. The said spring is designed and set so as to influence constantly the masses 36 against centrifugal force.

In order to avoid any one of such masses 36 being able to radiate outwards further than the others, all the springs are connected with one another so as to regulate the total pulling of the whole of the masses 36.

When the said masses have reached the end of their outward travel between position 29 and 30 as shown by Figure 3, the apparatus tends to work at maximum speed. Should its speed increase then cable 44, secured at 45 as well as cable 43 tightens round the brake drum 46 keyed on the stationary shaft and thus moderates the rotary speed of the apparatus to which it is secured.

So it becomes apparent that this braking in which all the masses 36 cooperate, checks and slows down the speed of the apparatus. As soon as the speed of the apparatus slows down, the masses 36, under the influence of springs 41 release their actions on the drum through cable 44 and the apparatus tends to resume a normal speed, being braked as above described whenever it exceeds the rate for which the fractional governor rim or felly is designed.

Figure 5:
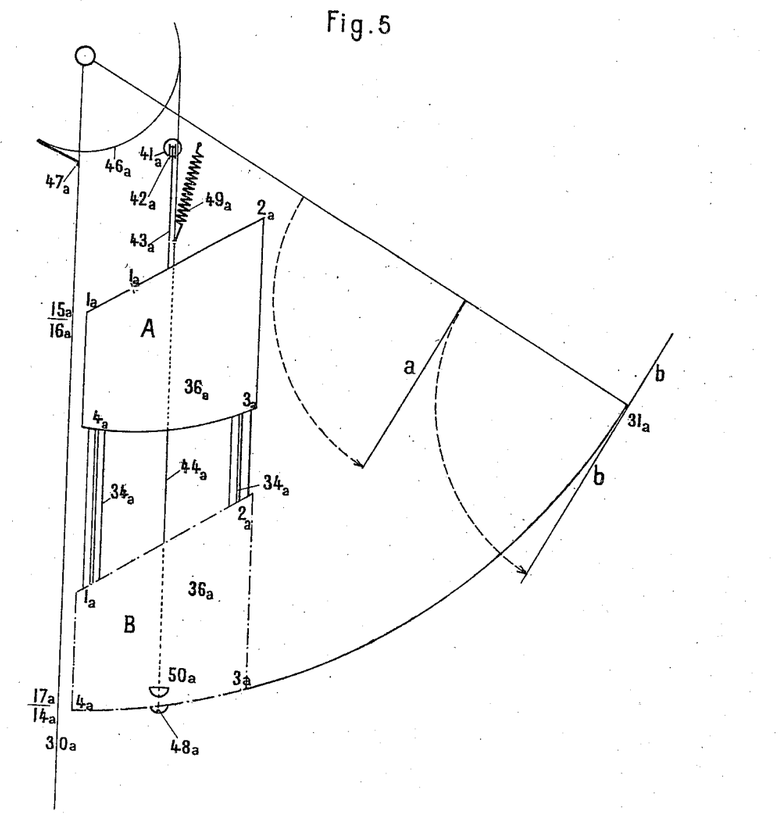
Figure 5 is a plan view of one of the many embodiments of the fractional rim or felloe.
Figure 6:
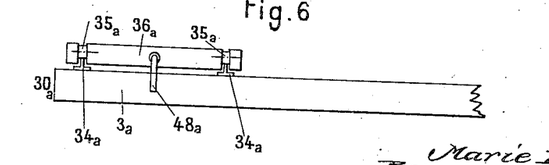
Figure 6 is a front view of the same.

Referring to Figures 5 and 6 the sector shown is between positions 30 and 31 of Figure 1, but in this case drum is prismatic. The two rails 34 support a mass 36 as seen in the two extreme positions A and B.

At A the side 1, 2, is parallel to the side of the drum against which, in normal position, it is kept by the spring 41, which through pulley 42, is connected with the masses 36 by means of cable 43.

When the turbine rotation drives the masses 36 to position B it is apparent that the edge 3, 4, of the mass corresponds to the turbine's curvature and outer circumference, the sides 1, 4, and 2, 3, of the said mass being in both A and B position, parallel to the driving surface 15, 16, 17, 14 of position 30.

In this example the surface 14, 15, 16, 17 is divided only into two panels $a$ and $b$, panel $b$ extends at $b^1$ by about two-fifths of its width, thus increasing outwards the driving surface.

As shown by the dotted arrows in the drawings which indicate the extreme limit of rotation of the panels around their axle, it is obvious that working of the mass 36 on its rails 34 neither obstructs nor hinders the panels' movements. Across and through the mass 36 is stretched a cable 44 secured at 48 to the turbine periphery and kept rigid outside drum 1 up to a fastening 48 by the action of a spring 49 which at the same time leaves it free to wind around the brake drum 46 secured to the stationary shaft 24 and at 47 to the framework of the apparatus. At the end of the cable near a point 48 is firmly secured an abutment thrust block or stop 50 against which the mass 36 will rest when it reaches its extreme position B. As will be readily understood, the cable 44 stretched under the pressure of the mass 36 acts energetically on the brake drum 46 and slows down the rotation of the apparatus. On the slowing down, the opposite takes place. The tension of spring 41 on mass 36 brings the latter backwards, spring 49 returns the cable to normal position and disengages from its end the brake drum 46 which releases the apparatus which can then put on speed again, and so on.

It should be clearly understood that the springs can be replaced by fractional counterweights or by a single counterweight in combination with a spring or with a lever. In the case of a fractional counterweight, the main weight balances the mass and the fractional weights kept apart are added to one another as under the influence of centrifugal force the mass tends to get away from the center.

With the counterweight and spring combination, the spring is there merely as a resistance against the pulling action of the mass under the action of centrifugal force.

A last device relates to governor means adapted to transform the turbines variable rotation rate under changing wind-thrust, into a regular rate of speed either of a dynamo or of a transmission or driven tool.

Figure 7:
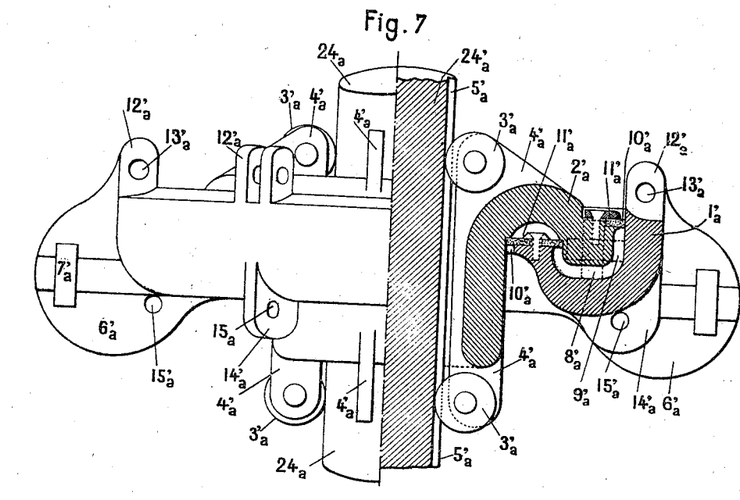
Figure 7 is an elevation, partly sectional of a governor bush.
Figure 8:
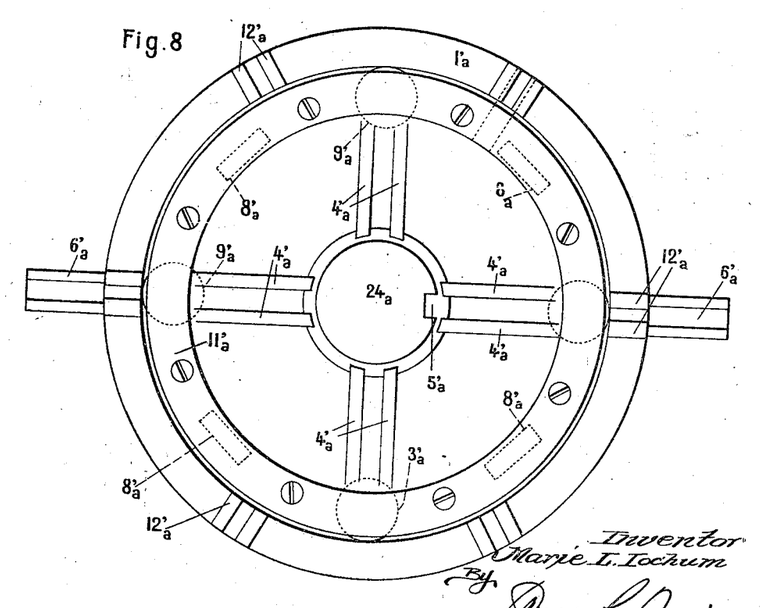
Figure 8 is a plan view of the same.

The device (Figs. 7 and 8) consists essentially of a rotary frame and a stationary frame 2 round the axis or axle 24. The frame 2 embraces axle 24 and by means of rollers 3 located on the ends of axially perpendicular double ribs 4, the rollers 3 of one of the said double ribs 4 are engaged in a cavity longitudinally reamed in shaft 24 and thus prevent the frame from rotation round axle 24 and compel it to roll along the said axle with a rectilinear motion.

The frame 1 comprises two lateral and axial lugs 6 carrying rollers 7. These two lugs engage the vertical guider of one piece with the turbine body, and said frame 1, which is cup-shaped, supports a frame 2 which rests on the bottom of the cup by means of rollers 8 shown in dotted lines at Fig. 8 and keeps a lateral contact with this frame by means of rollers 9. (See Fig. 8.) The cup contains lubricating oil and felt washers 10, held in place by means of rings 11, thus making the cup dust-tight.

On the upper periphery of the frame 1 are arranged six double lugs 12 serving to fasten axle 13 to cable 43 secured to the mass 36, (Figures 5 and 6). Above the frame and corresponding to lugs 12 are secured four ribs 14 which together with the two lugs 6 form six fastening points 15 for the springs 41.

Figure 9:
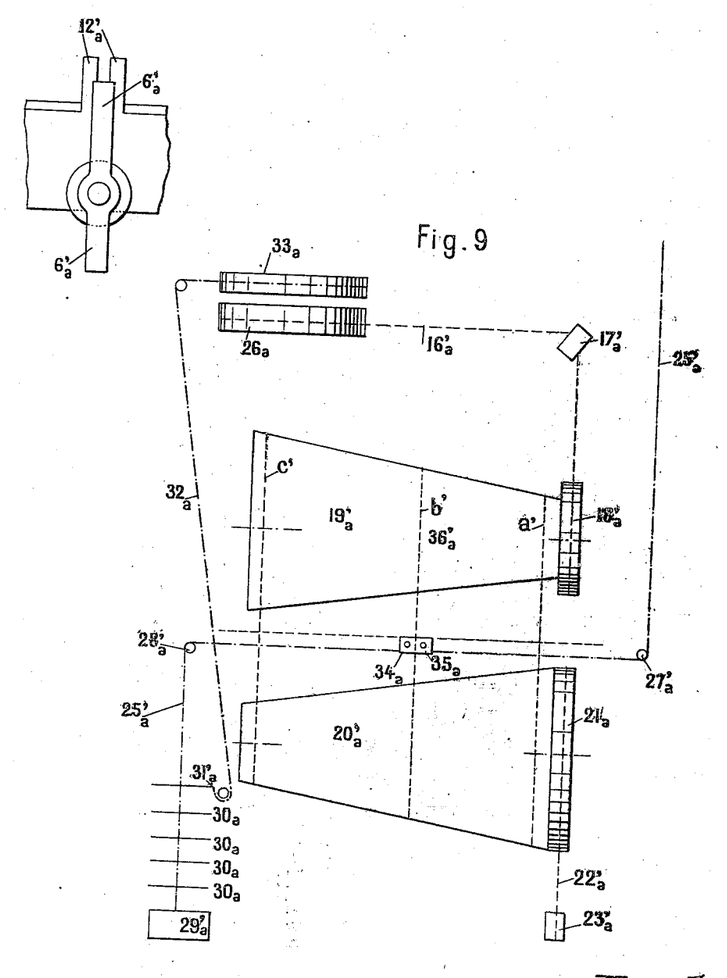
Figure 9 is a diagram of the device or arrangement between the bush shown by Figures 7 and 8 and the object driven.

Figure 9 shows at 26 the turbines control pulley which by means of a belt 16 and a bevel gear 17 drives the pulley 18 rigid with a cone or stepped pulley 19. This cone pulley 19, the axle of which is parallel to the axle of a cone pulley 20 of same size, but arranged inversely to pulley 19 drives the cone pulley 20 which is rigid with pulley 21 which by means of a belt 22 drives the dynamo's pulley 23.

A cable 25 secured to frame 2 and properly guided by pulleys 27 and 28, carries at its end a counterweight 29 ballasting the masses 36.

Above the counterweight 29 and maintained suitably spaced the counterweight plates 30 can add their weight to the weight 29 when, being drawn up by cable 32 and the latter by means of a suitable arranged set of pulleys winds round the brake drum 33 secured to and revolving with the turbine, the said cable 32 acts on the said brake drum as a moderator of the speed.

The working of the device will now be readily understood.

Figure 4:
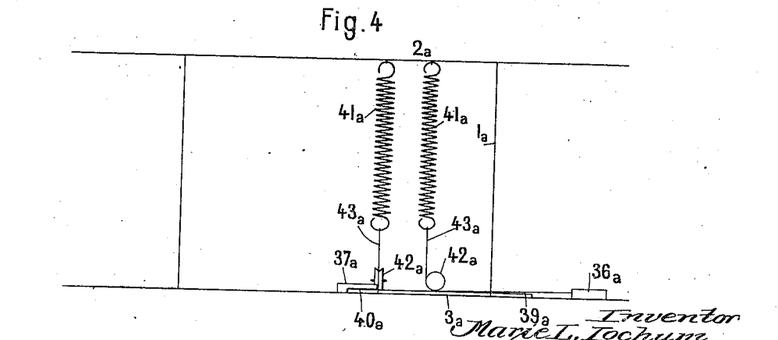
Fig. 4 is a section on the line 4—4 of Fig. 3.

The springs 41, Figures 4 and 5 keep the masses 36 Fig. 6 at low speed. As soon as the speed tends to increase, the masses 36 influence the bush's frame 1 which takes into it frame 2 in a movement longitudinal to axle 24. The frame 2 pulls on cable 25 which lifts the weight 29 and successively small weights 30 and 31 as speed increases.

But on the parts 27 to 28 of cable 25, is positioned a traveler 34 carrying the arms 35 of the fork which drags between its branches the belt 36 which transmits the movement of cone pulley 19 to cone pulley 20. In this way, the belt 36 may occupy all and any intermediary position from $a$ to $c$ passing by C. In position $a$ the turbine gives its maximum and in position C its minimum speed.

The only think required to obtain a perfectly regular motion is therefore a proper adjustment of the counterweight 29 and of the fractional weights 30 and 31.

Readily to achieve this result one needs but momentarily to replace the dynamo 23 by an electrical motor, rotating at 2000 revolutions and then adjust a winding to the various positions from $a$ to $c$ of belt 36 or cone pulley 19 and 20 the counterweights 29, 30 and 31 according to the influencer of centrifugal force on masses 36. This adjustment having been made and the dynamo restored in place of the motor, its potential will remain constant, however variable according to wind velocity the turbine delivery.

It must be understood, of course, that this specification of my invention is meant merely as explanatory and that I do not intend to limit my invention to it, since numerous modifications would be made in the details, shape, arrangements, number of similar members in the series of such without departing from the spirit of my invention.

Having now particularly described the nature of my said invention, and in what manner the same is to be performed, I declare that what I claim is:—

1. An atmospheric turbine, comprising a rotary mounted frame, a drum within said frame having a solid cylindrical wall concentric with the frame, vanes surrounding said frame arranged in series and rotatably mounted in said frame, the axis of each of said series lying in a radial extending plane, cross belts connecting the members of diametrically opposite series in such a manner that when one of said series of vanes is brought into position to be acted upon by the force of the wind, the other series will be in such a position that the wind will not act thereupon, the diameter of the drum being such that its periphery contacts with the free end of the innermost vane of each of series when the vanes of said series are in position to be acted upon by the wind.

2. An atmospheric turbine, comprising a rotatably mounted frame, series of vanes pivotally mounted on concentric circles within said frame, cross belts connecting diametrically opposite series in such a manner that when the vanes of one of said series are brought into position to be acted upon by the force of the wind, the vanes of the other series will be in such position that the wind will not act thereupon, the vanes of each series when in position to be acted upon by the wind lying in the same radial plane.

3. In combination with an atmospheric turbine, a frame rotatable about a vertical shaft and having vanes therein, means for regulating the speed of said turbine comprising a weighted mass radially movable on guideways in said frame, a brake drum, a band secured at one end to the mass and at the other to a fixed point on said frame and surrounding said drum.

4. In combination with an atmospheric turbine, a frame rotatable about a vertical shaft and having vanes therein, means for regulating the speed of said turbine comprising a weighted mass radially movable on guideways in said frame, a brake drum, a band secured at one end to the mass and at the other to a fixed point on said frame and surrounding said drum, and means to retract said weighted mass when the velocity of the frame decreases below a certain speed.

MARIE-LOUISE IOCHUM.